United States Patent Office 2,957,808
Patented Oct. 25, 1960

2,957,808

PROCESS FOR THE ISOLATION OF DIAGNOSTIC AND IMMUNIZING PROTEINACEOUS MATERIALS

Dan H. Campbell, Altadena, Calif., assignor to California Institute Research Foundation, Pasadena, Calif., a corporation of California No Drawing. Filed Nov. 10, 1958, Ser. No. 772,678

13 Claims. (Cl. 167—78)

This application is a continuation-in-part of my co-pending application Serial No. 603,798, filed August 13, 1956, which was in turn a continuation-in-part of my then co-pending application Serial No. 307,109, filed August 29, 1952, both now abandoned.

This invention relates to a method for, and a compound for use in, the isolation and purification of diagnostic and immunizing proteinaceous materials of the class generally known as antibodies and antigens from serums from immune animals and humans.

One of the principal objects of this invention is to provide a method which affords practical procedures for the isolation and purification of diagnostic and immunizing proteinaceous antibodies and antigens from immune serums.

Another object of this invention is to provide a method for the isolation of nonprecipitating antibodies from animal serums and allergic antibodies (reagins) from human serums.

Another object of this invention is to provide a method for the isolation of antigens specific to a selected nonprecipitating antibody from animal serums and allergic antibodies (reagins) from human serums.

A more specific object of this invention is to provide a method for insolubilizing a normally soluble diagnostic and immunizing proteinaceous material of the type exemplified by either antigens or antibodies whereby the antibody or antigen specific to the selected material may be combined specifically with the insolubilized material to give complexes that can be disassociated into easily separable soluble antigen or antibodies and insoluble material.

Other objects and advantages of this invention it is believed will be readily apparent from the following detailed description of preferred embodiments thereof.

Basically this invention in its broad aspect comprises a process for the isolation and purification of antigens and antibodies specific to a selected and designated diagnostic and immunizing proteinaceous material represented by antibodies and antigens. More specifically, the invention comprises the preparation of an insoluble complex cellulose compound which contains the selected diagnostic and immunizing proteinaceous antigen or antibody and to which may be joined an antibody or antigen specific to the selected antigen or antibody which antibody or antigen may be separated from the insolubilized proteinaceous material by suitable means. The complex cellulose compound therefore reacts as an adsorbent, but has the unique property of adsorbing only a specific material. Since for each antigen or antibody there is a corresponding and similar antibody or antigen which is specific to the selected antigen or antibody and since both antigens and antibodies may be treated as diagnostic and immunizing proteinaceous materials, it will be apparent that either antigens or antibodies may be insolubilized by the following described process and that the corresponding antibody or antigen specific to the selected and designated antigen or antibody may be isolated and purified by this method. I will, therefore, first treat the case of isolating antibodies specific to a selected diagnostic and immunizing proteinaceous antigen.

The cellulose compound may be generally designated as a cellulose antigen compound and the general method of synthesizing this compound consists in converting the cellulose to a p-nitrobenzyl cellulose, reducing the nitro group, diazotizing the resulting derivative and coupling the antigen. This cellulose-antigen compound which is insoluble will then adsorb antibodies specific to the selected antigen. The antibodies may subsequently be disassociated by acidifying an aqueous solution containing the complex.

The following is a specific example of a process for forming the cellulose-antigen compound and comprises a preferred embodiment of this part of the invention, but it is not intended to limit the invention thereto:

The first step in the process was the preparation of p-nitrobenzyl cellulose. Powdered cellulose (Solka-floc) was thoroughly washed with dilute acid, dilute alkali, and water, and then dried. Four grams of this material was then mixed with 12 g. of p-nitrobenzylchloride and 30 ml. of 40% sodium hydroxide and stirred vigorously at 95° C. (The reacting mixture was cooled during the first part of the exothermic reaction.) After four hours the mixture was poured into a large excess of cold water and filtered, and the residue was washed with water, with ethanol, and finally with acetone in a Soxhlet extractor. The product contained about 1.5 benzyl groups per glucose unit, and the yield, based on the cellulose used, was close to 100%.

Five grams of the nitro compound was suspended in 50 ml. of ethanol and heated to near boiling. The mixture was then stirred vigorously and 5 g. of sodium hydrosulfite ($Na_2S_2O_4.2H_2O$) dissolved in water was slowly added. After continued heating of the mixture for about 30 minutes the light yellow product (p-aminobenzyl-cellulose) was filtered off and washed with cold water.

*Diazotization*

Five grams of the p-aminobenzylcellulose was suspended in 10 ml. of 2 N HCl, then mixed with 20 ml. of water and chilled in an ice bath. With constant stirring, 0.5 M $NaNO_2$ solution was slowly added until a test with KI-starch paper remained positive for 15 minutes after addition of the last portion of nitrite. Stirring was then continued for another fifteen minutes and the material was filtered and washed with weakly acid ice water.

*Coupling to antigen*

The precipitate of diazonium salt was added to ice-cooled 2% solution of antigen in borate buffer pH 8.75. The antigen used was crystalline bovine albumin. The amount of dry antigen used for the coupling reaction was generally one-fourth to one-fifth of the dry weight of p-aminobenzylcellulose. The coupling mixture was stirred in an ice bath for 2 hours, the pH was adjusted to 7.3, and the mixture was stored at 4° C. for at least 36 hours. The product was then filtered and washed with large amounts of buffer. The amount of coupled albumin in the preparation used in the present study was about 1.5% of the total weight of the cellulose adsorbent.

*Covering unreacted diazonium groups*

The diazobenzylcellulose appeared to be a very stable compound; even after 50 hours unreacted diazonium groups are detectable in the coupling mixture. In order to prevent their interaction with serum antigens during adsorption experiments the preparation was allowed to react with betanaphthol, forming a dark red azo dye; proteinazobenzylcellulose was stirred for 30 minutes in 10 volumes of a saturated ice-cooled solution of betanaphthol in borate buffer of pH 8.75, followed by renewed washing on filter with buffer and water.

Since the color of the antigen-containing product was only faintly brownish, the reddish tint of the naphthol dye was a qualitative criterion for the completeness of the reaction with the antigen. It was assumed that steric hindrance made it impossible for the albumin molecules to couple with all available diazo groups, these being, on the other hand, easily reached by the much smaller naphthol molecule.

Having insolubilized the soluble proteinaceous antigen by preparing the insoluble antigen-containing cellulose compound, the antibody specific to the selected protein may now be isolated and purified. The following specific example illustrates the method by which the antibody or antiserum specific to the selected proteinaceous antigen, i.e., bovine albumin may be isolated and purified:

The antiserum was a pool obtained from rabbits after three to six months' immunization with bovine serum albumin (from the batch used for the tests). It contained about 3.39 mg. of precipitating antibody per ml.

A 5.0-ml. sample of this serum (containing 17.0 mg. of precipitating antibody) was diluted with 5.0 ml. of 1.0% saline and allowed to pass slowly from a delivery tube through a column of about 1.0 g. wet weight (0.46 g. dry weight) of the cellulose albumin adsorbent. The packed column was approximately 20 x 8 mm. in size. About 2 hours at room temperature was required for the 10 ml. of diluated serum to pass through by gravity only.

At the end of this time a small sample of filtrate was removed from the container for antibody determination and the remaining solution was passed through a second similar column. The filtrate from the second column contained no detectable antibody. Analysis of the first filtrate gave a value of about 7.20 mg. total precipitating antibody not adsorbed. This amounts to about 50% not absorbed by the gram of wet adsorbent. If no native antigenic groups had been destroyed in preparation of the adsorbent one would expect that the remaining 40% of antibody could be removed by passage through another column of similar dimensions, which was in fact accomplished.

The acid dissociation method was used to elute the antibody from the adsorbent. The adsorbent was removed from the two chromatographic tubes, suspended in 1.0% saline and saline washed and centrifuged three or four times, until the washings were biuret-negative. The adsorbent-antibody complex was resuspended in 1.0% saline. The pH was then adjusted to approximately 3.2 with 0.1 N HCl to dissociate the antibody and the suspension was stirred gently for 60 to 90 minutes at room temperature. The insoluble antigen-cellulose complex was removed by centrifugation, leaving the antibody in solution. The supernatant (antibody solution) was adjusted to pH 8.2 with borate buffer and tested for precipitating antibody.

Earlier experiments in which denatured albumin was used indicated that elution of antibody which had reacted with remaining antigenic groups was fairly simple. It has been found that ease of elution decreases with increasing length of time that the antibody is allowed to remain on the column. It is important, therefore, to remove the antibody as soon as possible. When columns are stored in the refrigerator for more than 2 days, little or not antibody can be eluted. The following typical elution experiment was carried out with the materials described above. Two samples of 5.0 ml. each of antiserum (3.39 mg. precipitable antibody per ml.) diluted with 5.0 ml. of 1.0% saline were passed through separate columns, each containing about 2.0 g. (wet weight) of adsorbent. One column was washed and the antibody was eluted immediately, and the other column was stored at 4° C. for 12 hours before the antibody was eluted. No precipitating antibody could be detected in either filtrate and hence it was assumed that all 17.0 mg. of antibody had been adsorbed in each case. A total of 14.64 mg. of antibody was recovered from the column eluted at once but only 9.50 mg. from the column stored for 12 hours at 4° C.

Purity (precipitable antibody/total protein) of recovered soluble material obtained by specific adsorption and elution is high. In the above experiment both columns were eluted at pH 3.2 at room temperature, and the eluate was adjusted to a final volume of 25 ml. The eluate from the first column contained 0.67 mg. of protein per ml., of which 0.59 mg./ml. was precipitable with antigen. The second column gave 0.42 mg. of protein per ml., with 0.38 mg. of precipitable antibody. The apparent purity was therefore slightly less than 90% in both these instances, and similar results were obtained with other preparations. It is likely that the eluted protein contains a still larger fraction of antibody, since the antigen-antibody ratio necessary for complete precipitation of antibody may not have been achieved in the precipitation tests.

In the above specific example, the proteinaceous antigen selected was bovine albumin. I have determined that any other proteinaceous antigen may be used in the reaction in the same molar ratios to insolubilize the antigen to form an insoluble antigen-containing cellulose compound permitting the isolation and purification of the antibodies specific to the selected antigen. For example, ovalbumin, toxins such as tetanus, diphetheria, and venoms and viruses such as polio readily lend themselves to the insolubilizing method of the present invention. The polio virus, for eaxample, could be insolubilized by the method shown and the antiserum specific to the polio virus would combine with the insoluble compound permitting it to be isolated and purified by the technique shown.

It has been determined that in every case the antibodies specific to the antigen selected in forming the cellulose antigen compound may be isolated by this method. It will, therefore, be apparent that this invention teaches a method of isolating the antibody specific to any selected antigen. Since ovalbumin and bovine serum albumin are used extensively in biochemical studies of diagnostic and immunizing proteinaceous materials, they are here identified as diagnostic and immunizing proteinaceous antigens.

In the above examples I have illustrated how soluble proteinaceous antigens may be insolubilized and antibodies specific to the selected antigen isolated and purified. It is also possible as will be demonstrated to insolubilize the antibody and isolate and purify the antigens.

The purified antiserum or antibody obtained by passing the antiserum through the column containing the cellulose albumin adsorbent was reacted with the diazonium salt of aminobenzyl cellulose described above in the manner described in connection with coupling of the protein to the salt. After obtaining the insoluble cellulose antibody complex, bovine serum albumin was passed through the column and adsorbed on the antibody. The acid dissociation method was used to elute the antigen and pure antigen was obtained thereby.

Since both antibodies and antigens are proteinaceous materials containing reactive amino groups the similarity of the reactions between the antigen and the diazonium salt and the antibody and the diazonium salt is not unexpected. Any other antiserum or antibody may be insolubilized by coupling it to the insoluble cellulose compound by the identical technique above described. It will be apparent, therefore, that the present invention teaches a method of isolating and purifying diagnostic and immunizing proteinaceous material specific to a selected antibody or antigen.

The above description and examples are intended to be illustrative only. Any modification or variation therefrom which conforms to the spirit of the invention is intended to be included in the scope of the appended claims.

I claim:
1. A process for isolating antibodies specific to a selected diagnostic and immunizing proteinaceous antigen comprising: forming the diazonium salt of p-aminobenzylcellulose, coupling a selected diagnostic and immunizing proteinaceous antigen to said salt to form an insoluble protein cellulose compound, commingling said compound with the antibody specific to the selected antigen whereby the antibody is adsorbed by said compound, and dissociating said antibody from said compound.

2. A process for isolating antibodies specific to a selected diagnostic and immunizing proteinaceous antigen comprising: forming the diazonium salt of p-aminobenzylcellulose, coupling a selected diagnostic and immunizing proteinaceous antigen to said salt to form an insoluble protein cellulose compound, commingling said compound with the antibody specific to the selected antigen whereby the antibody is adsorbed by said compound, acidifying the resultant reaction complex whereby the antibody is dissociated from the protein containing compound.

3. A process for isolating antibodies specific to a selected diagnostic and immunizing proteinaceous antigen comprising: forming p-nitrobenzyl cellulose, reacting said compound with sodium hydrosulfite to form p-aminobenzyl cellulose, reacting the amino compounds with sodium nitrite to form the diazonium salt of p-aminobenzylcellulose, adding the diazonium salt to a cooled solution of a selected diagnostic and immunizing proteinaceous antigen whereby the antigen is coupled to the salt forming an insoluble protein cellulose compound, commingling said compound with the antibody specific to the selected antigen whereby the antibody is adsorbed by said compound, and acidifying the resultant complex whereby the antibody is dissociated from the insoluble compound.

4. A process for isolating antibodies specific to a selected diagnostic and immunizing proteinaceous antigen comprising: forming p-nitrobenzyl cellulose, reacting said compound with sodium hydrosulfite to form p-aminobenzyl cellulose, reacting the amino compounds with sodium nitrite to form the diazonium salt of p-aminobenzyl cellulose, adding the diazonium salt to a cooled solution of a selected diagnostic and immunizing proteinaceous antigen whereby the antigen is coupled to the salt forming an insoluble protein cellulose compound, commingling said compound with the antibody specific to the selected antigen whereby the antibody is adsorbed by said compound, and acidifying the resulting complex removing the protein cellulose compound by centrifugation whereby the antibody is isolated.

5. A process for isolating antibodies specific to a selected diagnostic and immunizing proteinaceous antigen comprising: reacting cellulose with p-nitrobenzyl chloride in the presence of sodium hydroxide to form p-nitrobenzyl cellulose, reacting said p-nitrobenzyl cellulose with sodium hydrosulfite to form p-aminobenzyl cellulose, reacting the amino compounds with sodium nitrite to form the diazonium salt of p-aminobenzyl cellulose, adding the diazonium salt to a cooled solution of a selected diagnostic and immunizing proteinaceous antigen whereby the antigen is coupled to the salt forming an insoluble protein cellulose compound, commingling said compound with the antibody specific to the selected antigen whereby the antibody is adsorbed by said compound, and acidifying the resulting complex and removing the protein cellulose compound by centrifugation whereby the antibody is isolated.

6. A process as claimed in claim 5 wherein the antigen is tetanus toxin.

7. A process as claimed in claim 5 wherein the antigen is diphtheria toxin.

8. A process as claimed in claim 5 wherein the antigen is polio virus.

9. A process for isolating antibodies specific to a selected diagnostic and immunizing proteinaceous antigen comprising: forming the diazonium salt of a benzyl cellulose having an amino group substituted on the benzyl radical; coupling a selected diagnostic and immunizing proteinaceous antigen to said salt to form an insoluble protein cellulose compound, commingling said compound with the antibody specific to the selected antigen, whereby the antibody is adsorbed by said compound; and dissociating said antibody from said compound.

10. A process for isolating diagnostic and immunizing proteinaceous antigens specific to a selected antibody comprising: forming the diazonium salt of a benzyl cellulose having an amino group substituted on the benzyl radical; coupling a selected antibody to said salt to form an insoluble protein cellulose complex; commingling said compound with the antigen specific to the selected antibody, whereby the antigen is adsorbed by said compound; and dissociating said antigen from said compound.

11. A process for isolating the diagnostic and immunizing proteinaceous antigens specific to a selected antibody comprising: reacting cellulose with p-nitrobenzyl chloride in the presence of sodium hydroxide to form p-nitrobenzyl cellulose; reacting said p-nitrobenzyl cellulose with sodium hydrosulphite to form p-aminobenzyl cellulose; reacting the amino compound with sodium nitrite to form the diazonium salt of p-aminobenzyl cellulose; adding the diazonium salt to a cooled solution of a selected antibody whereby the antibody is coupled to the salt forming an insoluble, protein cellulose compound; commingling said compound with the antigen specific to the selected antibody whereby the antigen is adsorbed by said compound; and acidifying the resulting complex and removing the protein cellulose compound by centrifugation whereby the antigen is isolated.

12. A process for isolating diagnostic and immunizing proteinaceous antigens specific to a selected antibody comprising: forming the diazonium salt of p-aminobenzyl cellulose, coupling a selected antibody to said salt to form an insoluble protein cellulose compound, commingling said compound with the antigen specific to the selected antibody whereby the antigen is adsorbed by said compound; and dissociating said antigen from said compound.

13. A process for isolating diagnostic and immunizing proteinaceous materials of the group consisting of mutually specific antigen components and antibody components comprising: forming the diazonium salt of a benzyl cellulose having an amino group substituted on the benzyl radical; coupling a selected one of said components to said salt to form an insoluble protein cellulose compound; commingling said compound with the other of said components specific thereto whereby the said other component is adsorbed by said compound; and dissociating said other component from said compound.

References Cited in the file of this patent
UNITED STATES PATENTS

| 2,128,202 | Brockmuhl | Aug. 23, 1938 |
| 2,205,882 | Graves | June 25, 1940 |
| 2,243,213 | Kranzlein | May 27, 1941 |

OTHER REFERENCES

Landsteiner: The Specificity of Serological Reactions, Chas. C. Thomas, Springfield, Ill., 1936, pp. 100–148.

Boyd: Fundamentals of Immunology, 2nd ed., 1947, Intersci. Pub., N.Y., pp. 101–115.

Greenberg: Amino Acids and Proteins, Chas C. Thomas, 1951, pp. 673–675.

J. of Bacteriology, January 1936, pp. 65–66.

Chem. Abs., vol. 36, April 10, 1942, p. 2582.